United States Patent
Wernersson

(10) Patent No.: US 7,619,685 B2
(45) Date of Patent: Nov. 17, 2009

(54) OPTICAL RECORDING APPARATUS FOR WIRELESS EQUIPMENT INCLUDING INFRARED AND COLOR RECORDING DEVICES

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 633 days.

(21) Appl. No.: 11/247,420

(22) Filed: Oct. 11, 2005

(65) Prior Publication Data

US 2007/0081084 A1    Apr. 12, 2007

(51) Int. Cl.
*H04N 5/225* (2006.01)
(52) U.S. Cl. .................. 348/374; 348/273; 348/294; 348/345
(58) Field of Classification Search .......... 348/273, 348/342, 350, 374, 211.2, 294, 345
See application file for complete search history.

(56) References Cited

U.S. PATENT DOCUMENTS

| 5,982,423 | A | 11/1999 | Sekiguchi | |
|---|---|---|---|---|
| 7,292,281 | B2* | 11/2007 | Cheng | 348/373 |
| 7,365,771 | B2* | 4/2008 | Kahn et al. | 348/207.99 |
| 2002/0030755 | A1* | 3/2002 | Uchino | 348/342 |
| 2003/0012425 | A1* | 1/2003 | Suzuki et al. | 382/154 |
| 2003/0036365 | A1 | 2/2003 | Kuroda | |
| 2005/0140786 | A1* | 6/2005 | Kaplinsky | 348/207.1 |
| 2005/0253951 | A1* | 11/2005 | Fujimoto et al. | 348/335 |

FOREIGN PATENT DOCUMENTS

| EP | 0 605 898 B1 | 4/1998 |
|---|---|---|
| EP | 1 478 174 A2 | 11/2004 |
| EP | 1 487 199 | 12/2004 |

OTHER PUBLICATIONS

International Search Report for PCT/EP2006/008885 dated Jan. 17, 2007.

* cited by examiner

*Primary Examiner*—Lin Ye
*Assistant Examiner*—Gevell Selby
(74) *Attorney, Agent, or Firm*—Myers Bigel Sibley & Sajovec

(57) ABSTRACT

An optical recording apparatus for a wireless electronic equipment includes an infrared recording device configured to receive light in the infrared spectrum and record data according to the received infrared light, a color recording device configured to receive light in the visible spectrum and record data according to the received visible light, and an interface device configured to receive the recorded data from the infrared recording device and/or the color recording device and to forward the received data to a processing device.

16 Claims, 3 Drawing Sheets

OPTICAL RECORDING APPARATUS FOR WIRELESS EQUIPMENT INCLUDING INFRARED AND COLOR RECORDING DEVICES

FIELD OF THE INVENTION

The present invention relates to an optical recording apparatus for a wireless electronic equipment. In particular, the present invention relates to optical recording apparatus for a wireless electronic equipment for recording images in low light conditions.

BACKGROUND

State of the art digital cameras used in mobile phones may typically be used at light levels down to 5 to 10 lux. The image quality under such low light conditions may be poor, however.

Mobile phones of the state of the art typically include a white light emitting diode (LED) that may be used as an assisting light while capturing images. The LED makes it possible to use the camera even in complete darkness.

Some phones may even have a Xenon flash (discharge tube). The Xenon flash solution is considered a suitable choice from a technical/image quality point of view. Currently, a Xenon flash can only be used for still images, however. While the white LED solution can be used for still images and/or video recording/video conferencing, there are several disadvantages with the white LED solution. For example, the range is limited to about 0.5 m (in continuous use) due to power consumption and/or heat dissipation problems, which may be a severe limitation for video recording. While 0.5 m may be sufficient for video conferencing where the main purpose is to show the person making the call, another problem may arise. A strong white LED aimed directly towards a person's eyes may be very annoying. The user may also like to avoid attention when using the phone in a public environment. The video conferencing camera is usually aimed in the opposite direction to the phones main camera and cannot take advantage of the main camera's LED. The cost for an extra LED may rival the cost for the complete video camera itself.

Another possibility for recording in low light conditions is the night vision technology known from Sony video cameras as well as from surveillance equipment. This technique takes advantage of the fact that complementary metal-oxide-semiconductor (CMOS) and charge-coupled device (CCD) image sensors are very sensitive to infrared radiation (IR). A digital camera intended for normal use has an infrared cut off filter in order to reduce the cameras sensitivity to visible radiation. Without this filter the color rendition becomes poor.

A camera with a vision switch, such as a Sony video camera, has a removable IR-cut off filter. The filter is moved in or out of the optical path by some mechanical means. The camera is usually equipped with an IR-LED which lights up the scene with radiation invisible to the human eye. An IR-LED in combination with a night vision camera is much more efficient than a white LED used with a standard color camera. An obvious drawback with night vision is that only black and white pictures can be produced.

The implementation of a night vision camera in a mobile phone is more difficult due to the miniaturization of the camera and the high standards of robustness that may be required for mobile phones. A moveable filter is technically feasible, but adds cost, size and risk of mechanical failure. A further problem with the moveable filter solution is the fact that color cameras have color mosaic filters attached to each pixel of the sensor. The red, green, and blue filters are necessary for taking color pictures, but may reduce the efficiency of the night vision mode. This color filter array is an integrated part of the sensor and it cannot be removed.

SUMMARY

Some embodiments of the invention provide an electronic device including a dual camera configuration. An electronic device may include two or more cameras in a single camera module which share system resources for processing and/or recording images. One camera may be configured to record images in the infrared spectrum, while another camera may be configured to record images in the visible spectrum.

Accordingly, an optical recording apparatus for a wireless electronic equipment according to some embodiments of the invention includes an infrared recording device configured to receive light in the infrared spectrum and record data according to the received infrared light, a color recording device configured to receive light in the visible spectrum and record data according to the received visible light, and an interface device configured to receive the recorded data from the infrared recording device and/or the color recording device and to forward the received data to a processing device.

The infrared recording device may include an image sensor configured to record light in the infrared spectrum and a focusing device configured to focus light onto the image sensor.

The color recording device may include a color image sensor configured to record light in the visible spectrum, a focusing device configured to focus the light onto the color image sensor, and an infrared cut off filter configured to filter light in the infrared spectrum.

The infrared recording device may include a first image sensor configured to record light in the infrared spectrum and a first focusing device configured to focus light onto the image sensor, and the color recording device may include a second image sensor configured to record light in the visible spectrum, a second focusing device configured to focus the light onto the color image sensor, and an infrared cut off filter configured to filter light in the infrared spectrum.

The first focusing device and the second focusing device may be concurrently focused on the same object range such that the infrared recording device and the color recording device may be simultaneously focused at the same object range.

The color image sensor may include a color filter array configured to split light in the visible spectrum into fundamental colors, and an image sensor configured to record light in the visible spectrum.

An optical recording apparatus according to some embodiments of the invention may further include an opaque housing having an opening therein, an integrated chip disposed within the housing and including the interface device, the first image sensor and the second image sensor, and a space separator disposed within the housing and configured to separate a space within the housing between the color recording device and the infrared recording device.

The interface device may be connected to and/or may be integrally formed with a processing device that may be configured to process data recorded by the infrared recording device and/or the color recording device.

The processing device may be configured to sequentially process data from the infrared recording device and/or the color recording device.

The processing device may include a digital signal processor and/or a programmable general purpose processor.

An optical recording apparatus according to some embodiments of the invention may further include a mounting device located in the opening and configured to hold the first and second focusing devices and the infrared cut off filter.

The infrared cut off filter may be fixed within the mounting device.

The first and second focusing devices may be fixed at a focal distance within the mounting device.

The first and second focusing devices may be movable, and movements of the first and second focusing devices may be correlated with respect to each other in order to maintain a common object range for the infrared recording device and the color recording device.

The first and second focusing devices may be correlated in respect to each other by a focal distance altering device that may be configured to alter the focal distance of the focusing devices.

An optical recording apparatus according to some embodiments of the invention may further include an automatic focusing device configured to automatically focus one of the first and/or second focusing devices in response an ambient light condition.

An optical recording apparatus may further include an infrared light emitting diode configured to illuminate an object with light in the infrared spectrum.

An electronic system according to some embodiments of the invention includes an optical recording apparatus having an infrared recording device configured to receive light in the infrared spectrum and record data according to the received infrared light, a color recording device configured to receive light in the visible spectrum and record data according to the received visible light, and an interface device configured to receive the recorded data from the infrared recording device and/or the color recording device and to forward the received data to a processing device.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Relative terms such as "below" or "above" or "upper" or "lower" or "horizontal" or "vertical" may be used herein to describe a relationship of one element, feature or region to another element, feature or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
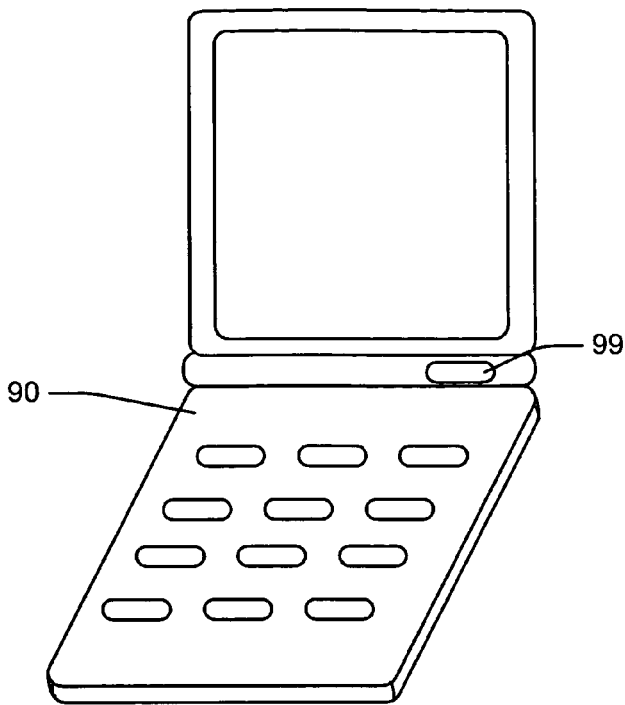
FIG. 1 shows an example of a wireless electronic equipment comprising an embodiment of the optical recording apparatus according to some embodiments of the present invention.

FIG. 1 shows a wireless electronic equipment including an optical recording apparatus 99 according to some embodiments of the invention. As used herein, the term electronic equipment includes portable radio communication equipment. The term portable radio communication equipment, which herein after is referred to as a mobile radio terminal, includes all equipment such as mobile telephones, pagers, communicators, i.e. electronic organizers, smartphones and/or the like. Thus, while the cell phone 90 and the placement of the optical recording apparatus 99 thereon are shown as exemplary embodiments of the present invention, the present invention may be embodied in many different forms.

Figure 2:
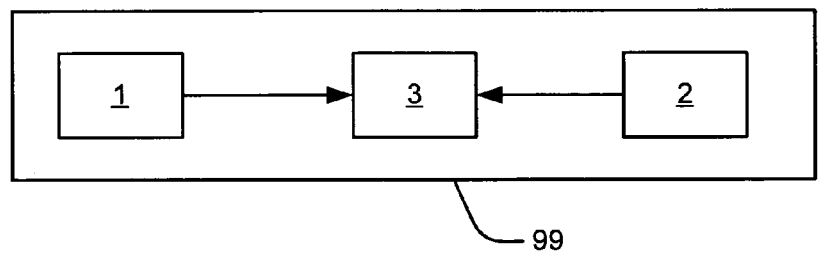
FIG. 2 shows a general, schematic view of an embodiment of the optical recording apparatus according to some embodiments of the present invention.

FIG. 2 shows a general, schematic view of embodiments of the present invention wherein an optical recording apparatus 99 includes an infrared recording device 2, a color recording device 1 and an interface device 3.

The infrared recording device 2 is designed to receive light in the infrared spectrum, focus the light on a recording device included therein, and transform the image into processable data. The wavelength of the light recordable by the infrared recording device 2 may range in the infrared spectrum from about 750 nm to about 1000 nm. The infrared recording device 2 is favourably utilised when recording in low light conditions, such as, for example, conditions in which the ambient light level is below 10 lux.

The color recording device 1 is designed to receive light in the visible spectrum, focus the light on a recording device included therein, and transform the image into processable data. The wavelength of the light recordable by the color recording device 1 may range in the visible spectrum from about 380 nm to about 750 nm. The color recording device 1 is favourably utilised when recording in normal or well lit conditions (e.g. above 10 lux).

The interface device 3 receives data from the color recording device 1 and/or the infrared recording device 2 and redirects the data to a next unit, such as a processing device.

This embodiment is located in a wireless electronic equipment as illustrated in FIG. 1.

Figure 3:
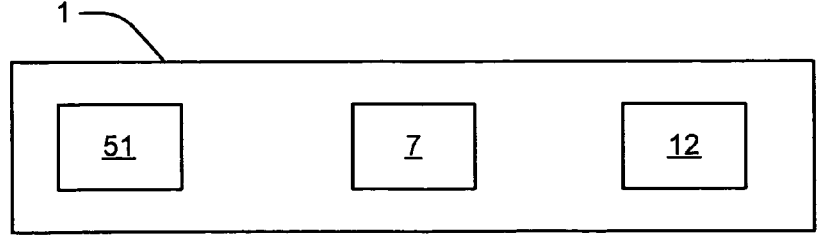
FIG. 3 shows a schematic view of a color recording device according to some embodiments of the present invention.

FIG. 3 shows a schematic view of a color recording device 1 of the optical recording device of in FIG. 2 according to some embodiments of the present invention. The color recording device may include a focusing device 51, an infrared cut off filter 7 and a color image sensor 12.

The color recording device 1 is the same as described in FIG. 2.

The focusing device 51 is configured to receive light from an object and focus it on the color image sensor 12. The focusing device 51 can include either a complete system of a plurality of optical components or only one part. On its way to the color image sensor 12, the received light is filtered by an infrared cut off filter 7. The infrared cut off filter 7 filters out light in the infrared spectrum, before the received light hits the color image sensor 12. The color image sensor 12 receives the filtered light and transforms it into electronic data according to the wavelength and/or intensity of the light.

Figure 4:
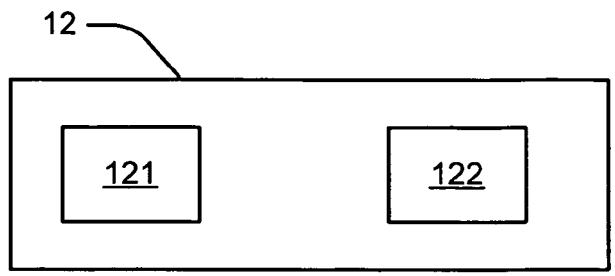
FIG. 4 shows a schematic view of a color image sensor according to some embodiments of the present invention.

FIG. 4 shows a schematic view of a color image sensor 12 according to some embodiments of the present invention. The color image sensor 12 may include a color filter array 121 and an image sensor 122.

The color filter array 121 splits the light of the visible spectrum into its fundamental colors. Depending on the image sensor's 122 properties, the color filter array 121 may include a typical color pattern like e.g. the colors red, green and blue or cyan, magenta and yellow. After the light travels through the color filter array 121, it engages with the image sensor 122 which transforms the light into electronic data according to the wavelength and/or intensity of the light.

Figure 5:
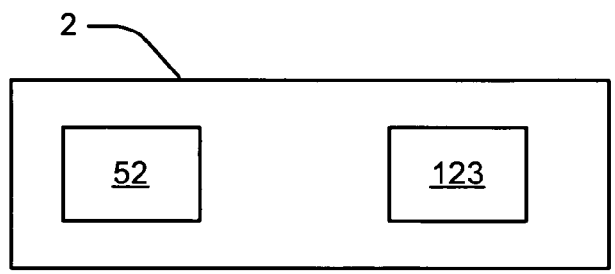
FIG. 5 shows a schematic view of an infrared recording device according to some embodiments of the present invention.

FIG. 5 shows a schematic view of an infrared recording device 2 according to some embodiments of the present invention. The infrared recording device 2 may include a focusing device 52 and an image sensor 123.

The infrared recording device 2 may have the same function as described in connection with FIG. 1.

The focusing device 52 may have the same function as the one described in FIG. 2 and the image sensor 123 may have the same function as the one described in FIG. 3. Since no color filter array is applied to the incident light, a higher sensitivity for infrared light may be attainable compared conventional cameras recording both color and infrared on the same sensor using a color filter array.

Figure 6:
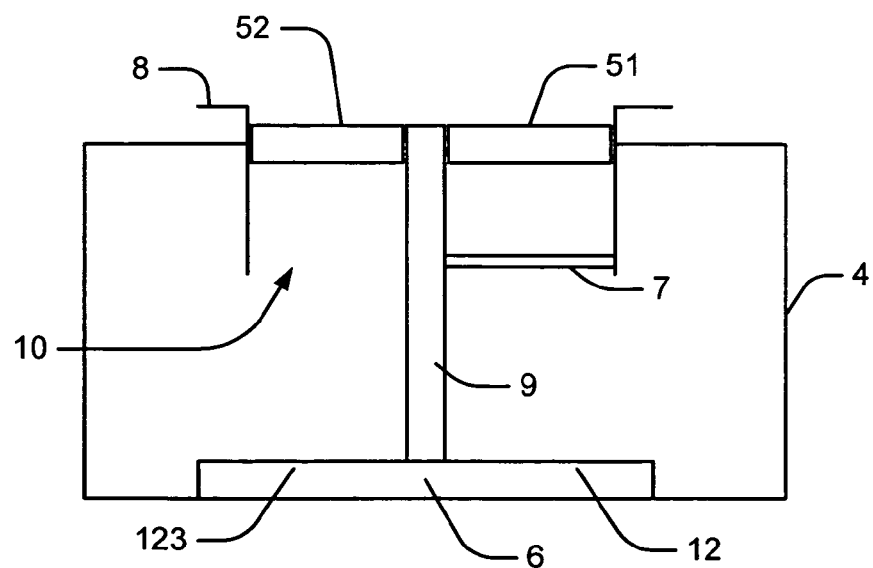
FIG. 6 shows a cross section of an embodiment according to some embodiments of the present invention.

FIG. 6 shows a cross section of a device according to some embodiments of the present invention. It includes a housing 4, a space separator 9, an integrated chip 6, the infrared cut off filter 7, two focusing devices 51 & 52 and a mounting means 8.

The housing 4 may be opaque to avoid incident light which did not travel through a focusing device 51 and/or 52 from striking a respective image sensor 12, 123. It also includes an opening 10 wherein the mounting means 8 is set up. The housing 4 may be broad enough to house the integrated chip 6 and high enough to allow reasonable focusing with the focusing devices 51 & 52 and enough space for the additional infrared cut off filter 7 arranged between the focusing device 51 and the color image sensor 12.

The space separator 9 is used in the housing 4 to separate the space located between the infrared image sensor 123 and its corresponding focusing device 52 and the other space located between the color image sensor 12 and its corresponding focusing device 51. Thus, it may be possible to record two images concurrently and independently without incidence of light destined for the other sensor. That is, one image sensor 123 records the infrared light without a color filter array and the other image sensor 12 records only visible light.

The integrated chip 6, which is located within the housing 4 in a spaced relationship from the opening 10, may include the color image sensor 12, the image sensor 123 and the interface device 3 as integrated parts. Alternatively, or additionally, the color image sensor 12, the image sensor 123 and the interface device 3 may be provided as discrete elements.

The mounting means 8 is set up in the opening 10 of the housing 4 and includes the focusing devices 51 & 52 and the infrared cut off filter 7. If required, the mounting means 8 is movable to and from the integrated chip 6 as described later. The infrared cut off filter 7 is fixedly set up in the mounting means 8. Thus robustness, simplicity in the design and small camera sizes are assured compared to the prior art.

The focusing devices 51 & 52 may be as described in connection with FIGS. 2 and 4. The infrared cut off filter 7 may be as described in connection with FIG. 2. The color recording device 1 and the infrared recording device 2 may be configured as shown in FIGS. 2 and 3, respectively.

To allow simple switching between the color recording device 1 and the infrared recording device 2 without refocusing on the recording range, the images of both recording means may be focused concurrently; independent of the object range achievable by an embodiment of the present invention. Three exemplary approaches to correlating the focusing devices 51 & 52 with each other which are described as follows:

In one approach, the mounting means 8 may be movable into/out of the opening 10. That is, the mounting means 8 may be movable to and from the integrated chip 6 and the sensors 123, 12. Since the focusing devices 51, 52 are fixedly set up in the mounting means 8, they may be calibrated during the assembly of the camera to ensure concurrently focused images for the same recording range for the infrared recording device 2 and the color recording device 1.

Another approach is to achieve the focusing by the focusing devices 51 & 52 themselves instead of moving the mounting means 8. The focusing devices 51 & 52 may be correlated the whole time with each other in a way that may avoid refocusing when switching from the infrared recording device 2 to the color recording device 1, or the other way around. Thus once the object is focused, the image will stay focused when switching between the recording devices 1, 2. The focusing may be achieved by a focal distance altering device as described below.

In another approach, the focusing devices 51, 52 may be focused during assembly at the same fixed focal distance. This focal distance is not alterable after the assembly since neither the focusing devices 51 & 52 nor their mounting means 8 will be movable and no other device operable to alter the focal distance will exist; thus the focusing devices 51 & 52 are fixedly set up in the mounting means 8. This fixed focal distance may be chosen for a specific range depending on the application.

Figure 7:
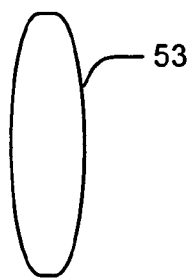
FIG. 7 shows an example of a focusing device according to some embodiments of the present invention.

FIG. 7 shows an example of a focusing device 51, 52 according to some embodiments of the present invention. The focusing device 51, 52 may include a biconvex lens 53. Alternatively, the focusing device 51, 52 may include e.g. a planar convex lens 53. These examples illustrate that a focusing device 51, 52 may be a simple system of one lens 53 instead of a complex system having a plurality of optical parts.

Figure 8:
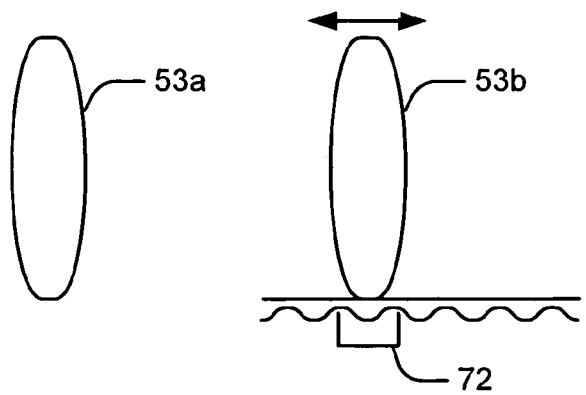
FIG. 8 shows an example of a focusing device according to some embodiments of the present invention

FIG. 8 shows an example of an optical system 57 according to some embodiments of the present invention. It includes two lenses 53a, 53b, which may provide a system including plurality of optical parts, and a focal distance altering device 72. In particular, the focal distance altering device 72 may controllably change the distance between the two lenses 53a, 53b, which may thereby change the focal length of the optical system 57.

There are other examples for the biconvex lenses possible including prisms and other types of lenses like concave ones. There are also other examples for a focal distance altering device 72 than the one described in FIG. 8. This one is working with a rail system and a gear-wheel moving one lens away or towards the other lens to alternate the focal distance. The movable lens is set up on the rail system.

Figure 9:
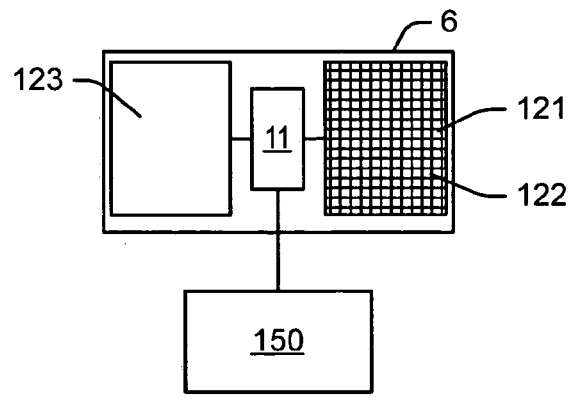
FIG. 9 shows a general layout of the integrated chip according to some embodiments of the present invention.

FIG. 9 shows an example of the layout of the integrated chip 6 according to some embodiments of the present invention. It includes two image sensors, namely, a color image sensor 122 and an infrared image sensor 123, and an interface device 11.

The color image sensor 122 is equipped with a color filter array 121. The other sensor 123 is for the infrared recording device 2. Both sensors are preferably of the same type to reduce costs, and may be designed to identify infrared light and visible light. While the sensors 123 & 122 are of the same type, the color image sensor 122 differs from the image sensor 123 recording the infrared light in that the color image sensor 122 includes a color filter array 121. Thus both image sensors 123 & 122 may be capable of recording both infrared and visible light; depending whether they are equipped with the color recording array 121 and/or the infrared cut off filter 7. The sensors 122 & 123 themselves are preferably of the CIF format but can be of any other electronic sensor responsive to visible and infrared radiation and capable of generating an electronic signal in response to an optical signal.

The interface device 11 is operable to receive and redirect data from the infrared image sensor 123 and/or the color image sensor 122 as described in FIG. 2. The interface device 11 may be connected to or integrated with a processing device 150 which is configured to process data from the sensors 122, 123 redirected by the interface device 11 and/or to handle images processing and/or communication tasks. The processing device 150 may be, for example, a digital signal processor and/or a general purpose programmable processor configured to perform the functions described herein. The processing device 150 may be configured to process the data captured by one sensor 122, 123 at a time and/or in parallel. The processing device 150 illustrated in FIG. 9 is only provided as an example. Accordingly processing and/or control functions of a device 99 according to some embodiments of the invention may be implemented in many different ways. It is also a possibility to record the data of both sensors at the same time. The processing device is located on the integrated chip 6, but can be also located on a separate chip inside the housing 4 or on a separate chip outside the housing 4.

Figure 10:
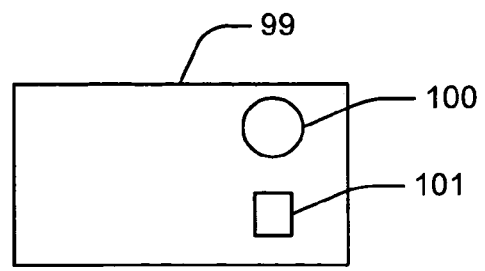
FIG. 10 shows a schematic view of an optical recording apparatus comprising an additional infrared light source, according to some embodiments of the present invention.

FIG. 10 shows a schematic view of an optical recording apparatus 99 according to some embodiments of the present invention. It includes an infrared light source 100 and an automatic focusing device 101.

This light source 100 emits infrared light and helps to light up the environment and the object being pictured. Preferably the light source includes an infrared LED 100, which may consume a small amount of energy. Even though the infrared recording device 2 may be capable of recording better images than the color recording device 1 in low light conditions, the infrared light source may improve the image quality for a trade-off of a small and energy-efficient infrared light source such as an infrared LED.

Advantageously, a possible arrangement of the present invention may also include an automatic focusing device 101 for automatically focusing one of the focusing devices 51, 52, preferably the one whose image sensor has the better image resolution at a specific light condition. For example, in low light conditions the infrared recording device may be chosen, and in normal lit or well lit conditions the color recording device may be chosen.

The following are examples of the formats of image sensors 123 & 122:

Video telephony is currently limited in image resolution to the QCIF format (176×144 pixels). The sharpest possible images are not produced with a QCIF sensor due to the effect of the color interpolation process. Using a CIF format sensor (352×288 pixels) and reducing the image format digitally yields better results. Solutions using even higher resolutions (e.g. VGA, 640×480 pixels) are possible sensor implementations.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An optical recording apparatus for a wireless electronic equipment, comprising:
   an infrared recording device configured to receive light in the infrared spectrum and record data according to the received infrared light;
   a color recording device configured to receive light in the visible spectrum and record data according to the received visible light;
   an interface device configured to receive the recorded data from the infrared recording device and/or the color recording device and to forward the received data to a processing device;
   an opaque housing having an opening therein;
   an integrated chip disposed within the housing and comprising the interface device, the first image sensor and the second image sensor; and
   a space separator disposed within the housing and configured to separate a space within the housing between the color recording device and the infrared recording device;
   wherein the infrared recording device comprises a first image sensor configured to record light in the infrared spectrum and a first focusing device configured to focus light onto the image sensor, and wherein the color recording device comprises a second image sensor configured to record light in the visible spectrum, a second focusing device configured to focus the light onto the color image sensor, and an infrared cut off filter configured to filter light in the infrared spectrum.

2. An optical recording apparatus according to claim 1, wherein the infrared recording device comprises an image sensor configured to record light in the infrared spectrum and a focusing device configured to focus light onto the image sensor.

3. An optical recording apparatus according to claim 1, wherein the color recording device comprises a color image sensor configured to record light in the visible spectrum, a focusing device configured to focus the light onto the color image sensor, and an infrared cut off filter configured to filter light in the infrared spectrum.

4. An optical recording apparatus according to claim 1, wherein the first focusing device and the second focusing device are concurrently focused on the same object range such that the infrared recording device and the color recording device may be simultaneously focused at the same object range.

5. An optical recording apparatus according to claim 3, wherein the color image sensor comprises a color filter array configured to split light in the visible spectrum into fundamental colors, and an image sensor configured to record light in the visible spectrum.

6. An optical recording apparatus according to claim 1, wherein the interface device is connected to and/or is integrally formed with a processing device that is configured to process data recorded by the infrared recording device and/or the color recording device.

7. An optical recording apparatus according to claim 6, wherein the processing device is configured to sequentially process data from the infrared recording device and/or or the color recording device.

8. An optical recording apparatus according to claim 6, wherein the processing device comprises a digital signal processor and/or a programmable general purpose processor.

9. An optical recording apparatus according to claim 1, further comprising a mounting device located in the opening and configured to hold the first and second focusing devices and the infrared cut off filter.

10. An optical recording apparatus according to claim 9, wherein the infrared cut off filter is fixed within the mounting device.

11. An optical recording apparatus according to claim 1, wherein the first and second focusing devices are fixed at a focal distance within the mounting device.

12. An optical recording apparatus according to claim 1, wherein the first and second focusing devices are movable, and wherein movements of the first and second focusing devices are correlated with respect to each other in order to maintain a common object range for the infrared recording device and the color recording device.

13. An optical recording apparatus according to claim 1, wherein the first and second focusing devices are correlated in respect to each other by a focal distance altering device that is configured to alter the focal distance of the focusing devices.

14. An optical recording apparatus according to claim 12, further comprising an automatic focusing device configured to automatically focus one of the first and/or second focusing devices in response an ambient light condition.

15. An optical recording apparatus according claim 1, further comprising an infrared light emitting diode configured to illuminate an object with light in the infrared spectrum.

16. An electronic system comprising an optical recording apparatus according to claim 1.

* * * * *